United States Patent [19]

Konishi et al.

[11] Patent Number: 4,593,778
[45] Date of Patent: Jun. 10, 1986

[54] WEIGHING MACHINE WITH DUMMY LOAD CELL FOR ERROR CORRECTION

[75] Inventors: Satoshi Konishi, Kusatsu; Kazumi Kitagawa, Shiga; Michito Utsunomiya, Kusatsu, all of Japan

[73] Assignee: Kabushiki Kaisha Ishida Koki Seisakusho, Kyoto, Japan

[21] Appl. No.: 620,040

[22] Filed: Jun. 13, 1984

[30] Foreign Application Priority Data

Jun. 21, 1983 [JP] Japan ................... 58-110150
Jan. 27, 1984 [JP] Japan ................... 59-12016

[51] Int. Cl.$^4$ ................ G01G 23/06; G01G 23/10; G01G 3/08
[52] U.S. Cl. ........................ 177/185; 177/187; 177/229
[58] Field of Search ............. 177/184, 185, 186, 187, 177/188, 189, 211, 229

[56] References Cited

U.S. PATENT DOCUMENTS

| 3,371,731 | 3/1968 | Connors et al. | 177/188 X |
| 3,736,998 | 6/1973 | Flinth et al. | 177/187 |
| 4,298,081 | 11/1981 | Blodgett | 177/187 |
| 4,382,479 | 5/1983 | Lee et al. | 177/189 |
| 4,396,080 | 8/1983 | Dee | 177/185 |
| 4,513,831 | 4/1985 | Lee et al. | 177/189 |

FOREIGN PATENT DOCUMENTS 2104667 3/1983 United Kingdom ......... 177/210 FP

Primary Examiner—E. A. Goldberg
Assistant Examiner—Patrick W. Foster
Attorney, Agent, or Firm—Browdy and Neimark

[57] ABSTRACT

The invention of this application relates to a weighing machine in which a weighing member such as a weighing saucer or hopper holding or accommodating the materials to be weighed is provided on one side of a load cell through a support, and the load cell is supported on the other side thereof on a frame directly or indirectly through an elastic body for absorbing vibrations. The weighing machine is basically constructed so that the load cell is supported on the other side thereof on the frame through a strain generator for allowing damping in the fixed direction and, at the same time, through an anti-vibration damper for improving a damping characteristic, whereby vibrations of the load cell is damped promptly. Further, a dummy cell having the same natural frequency as the load cell is associated with the load cell and then supported on the frame in a similar manner, to remove a vibration signal from the base out of a detection signal from the load cell, thereby making it possible to carry out detection of weight accurately.

2 Claims, 35 Drawing Figures

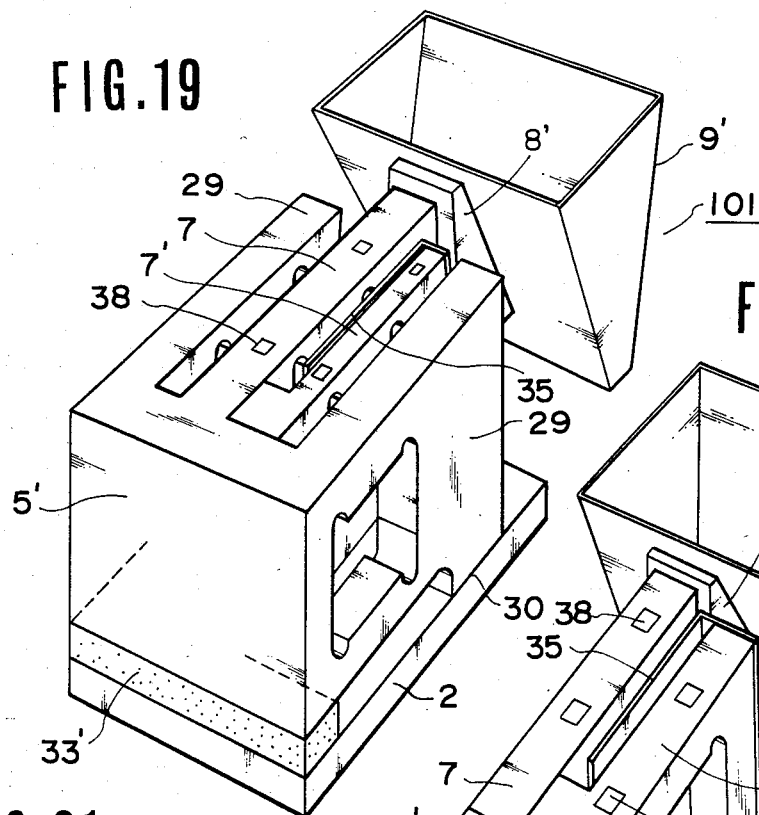
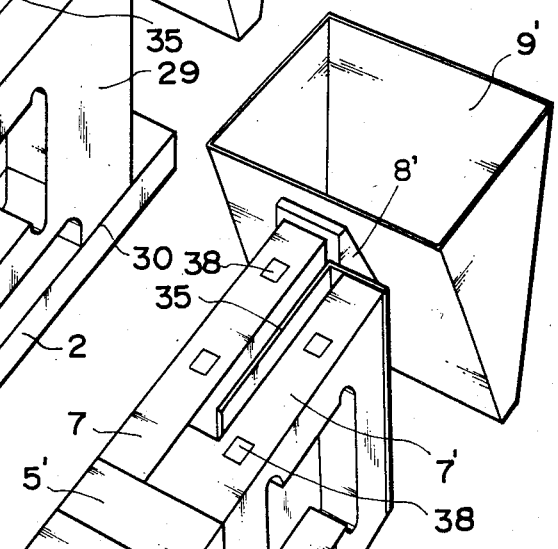
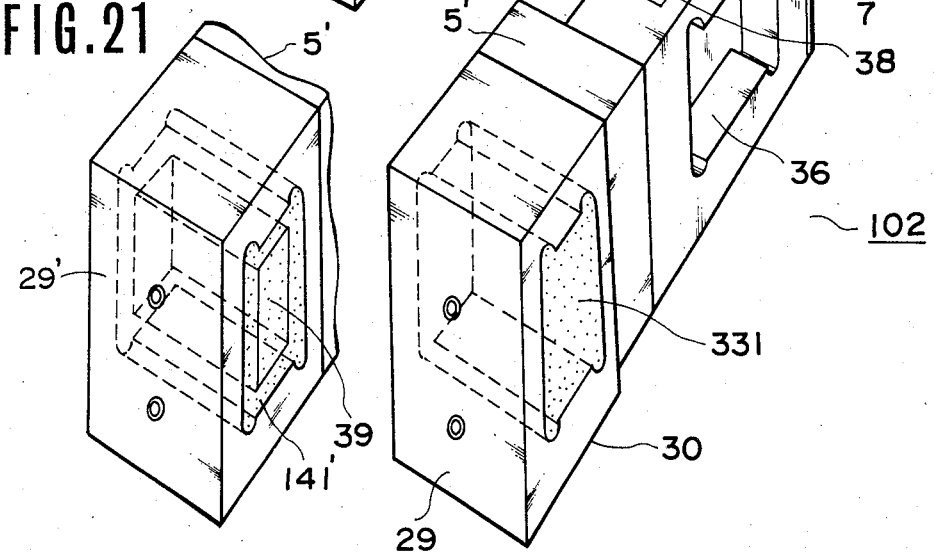

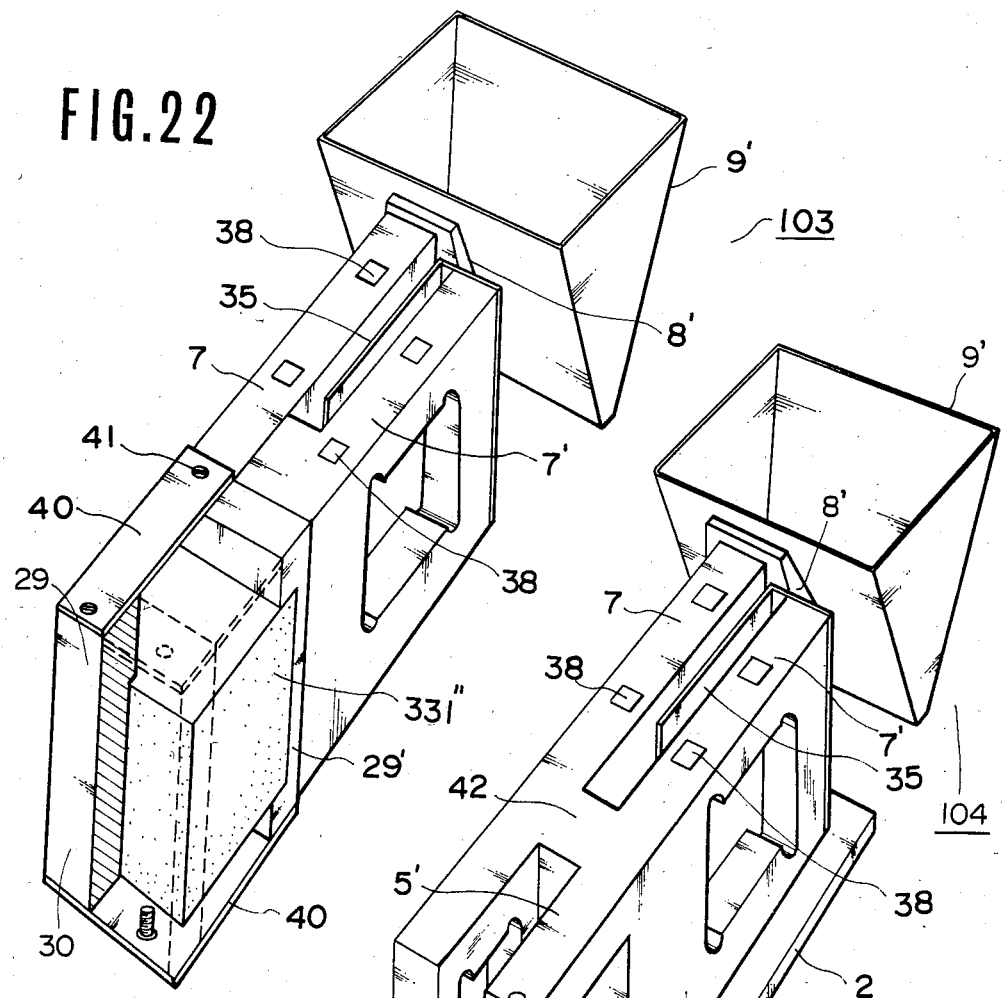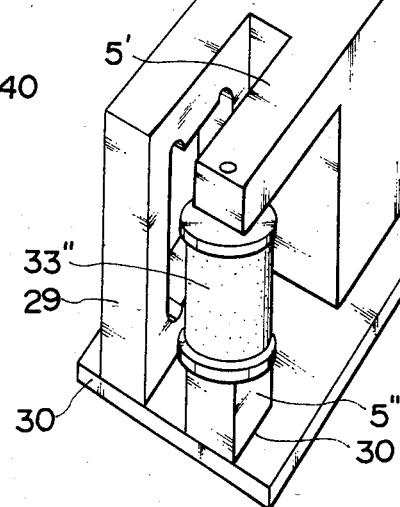

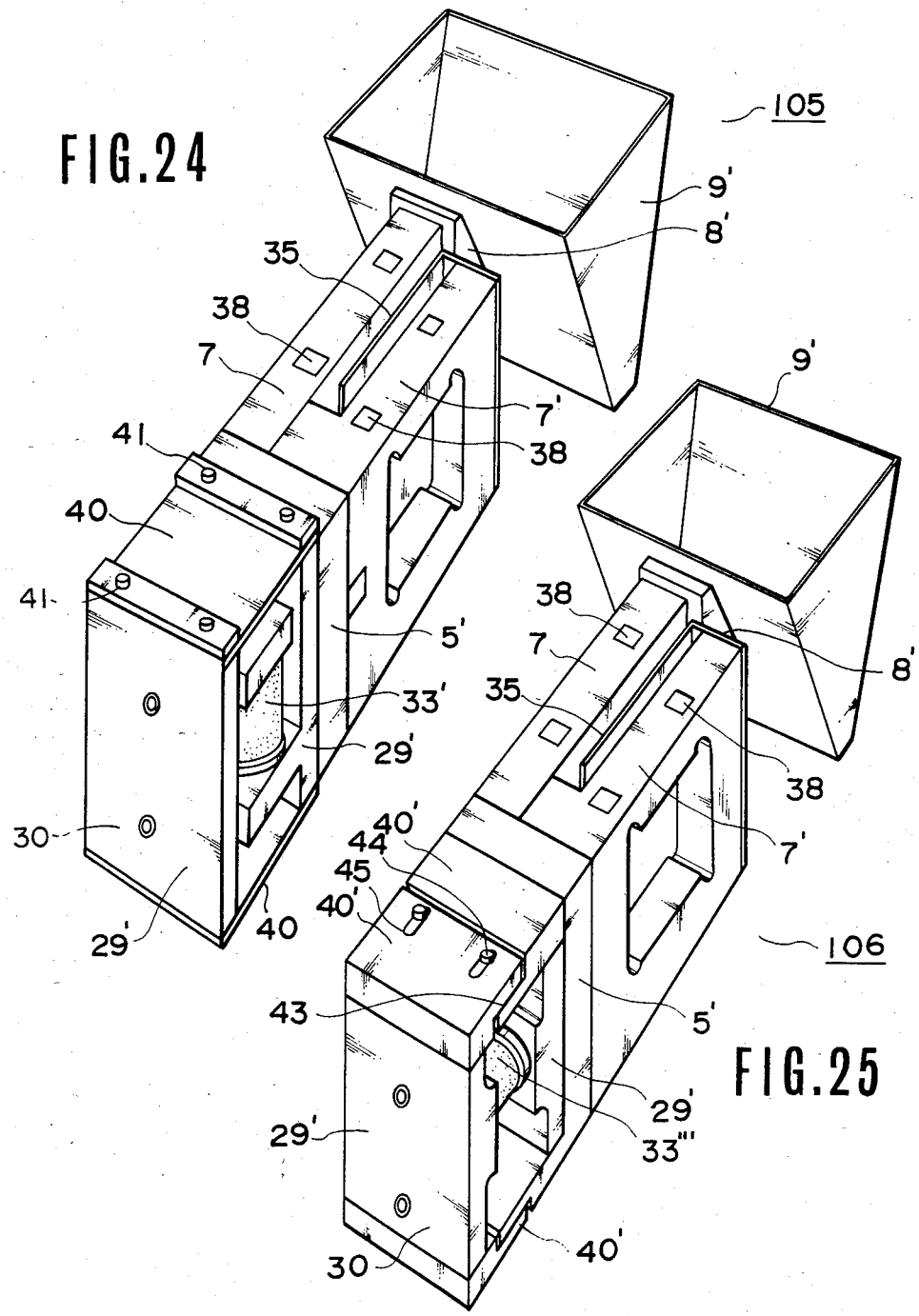

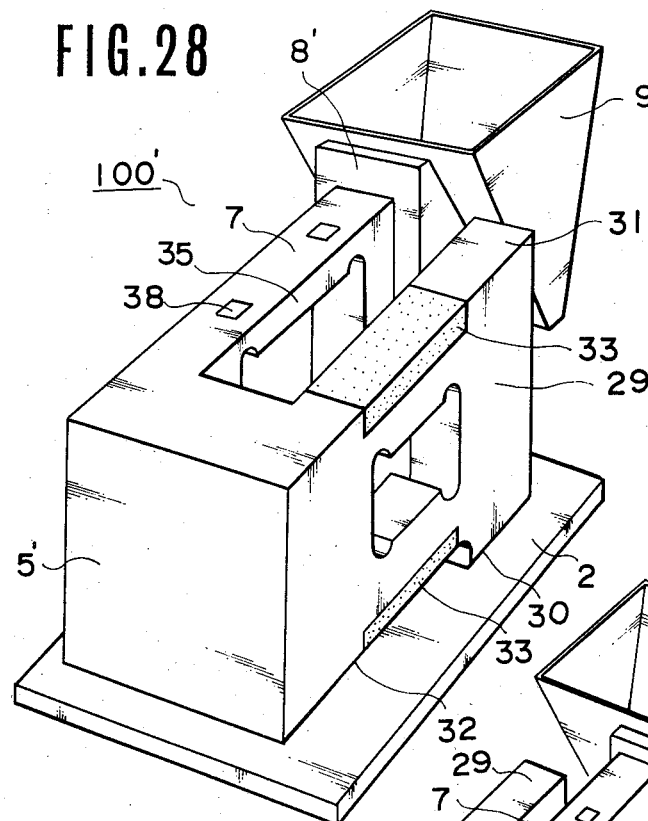
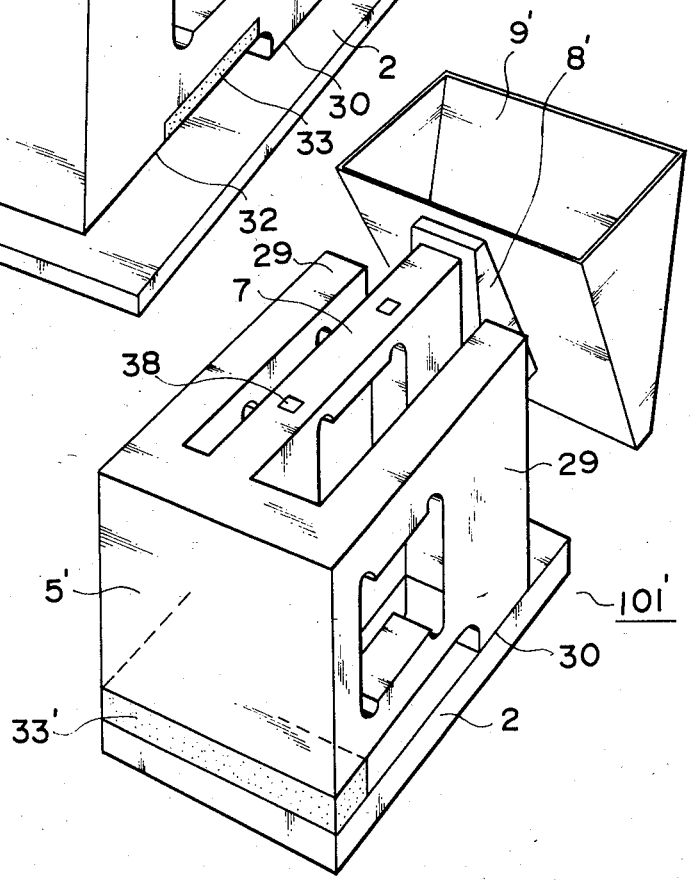

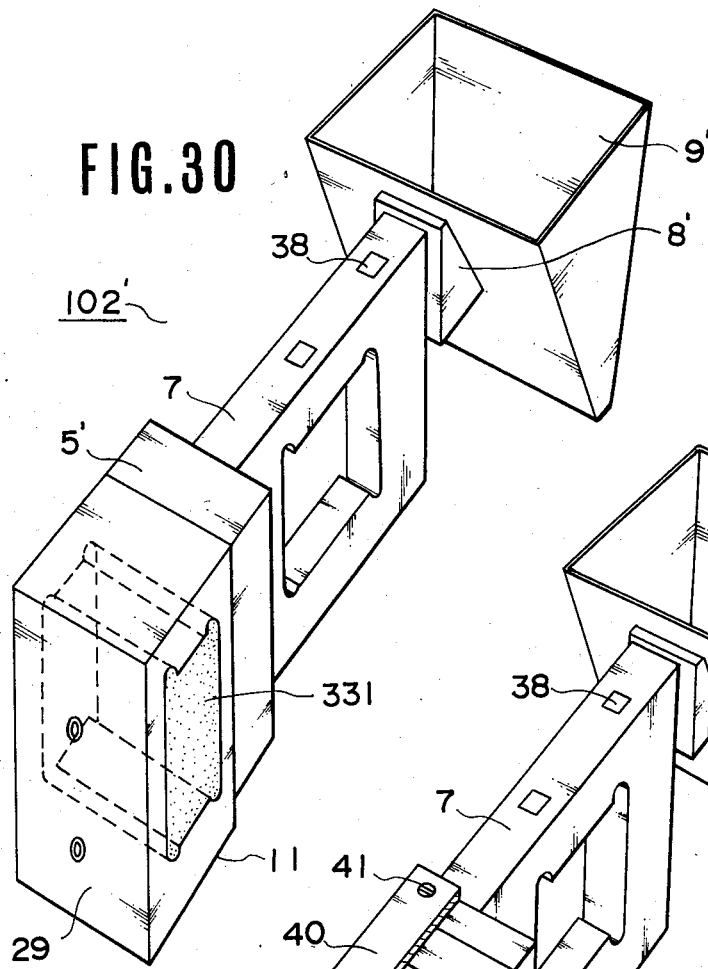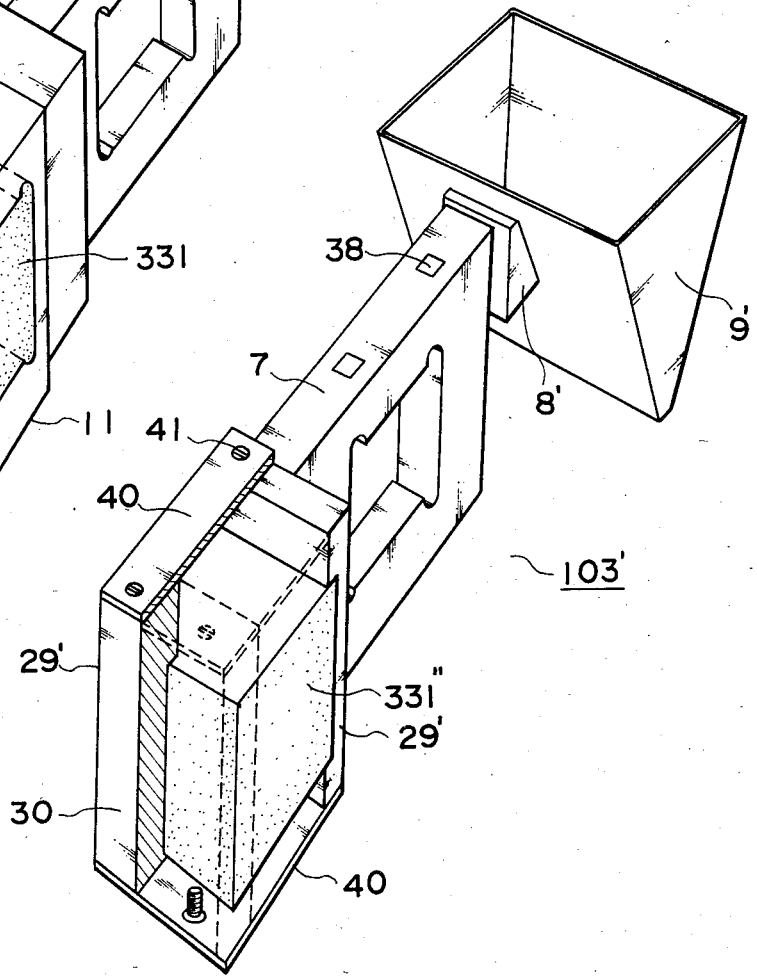

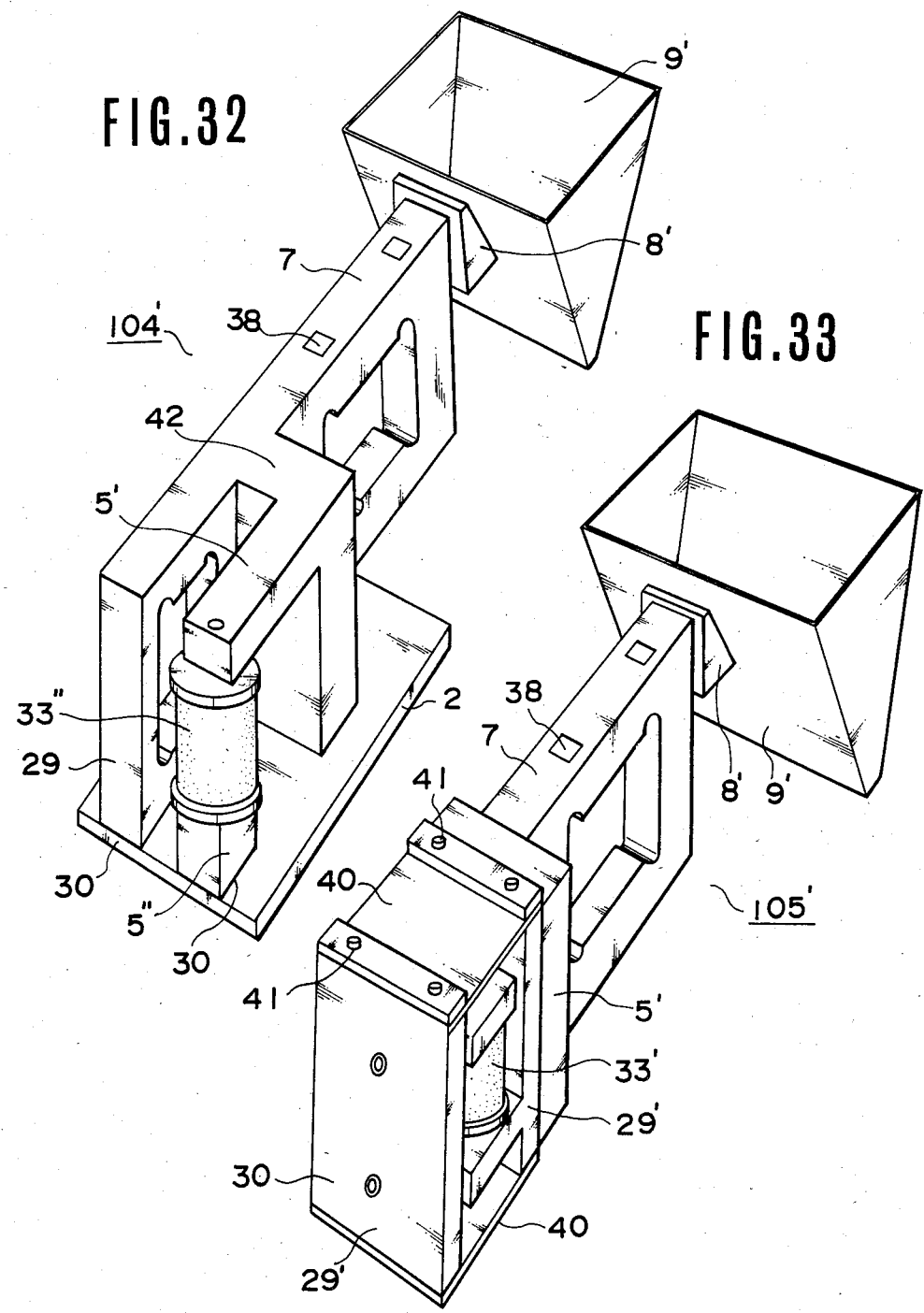

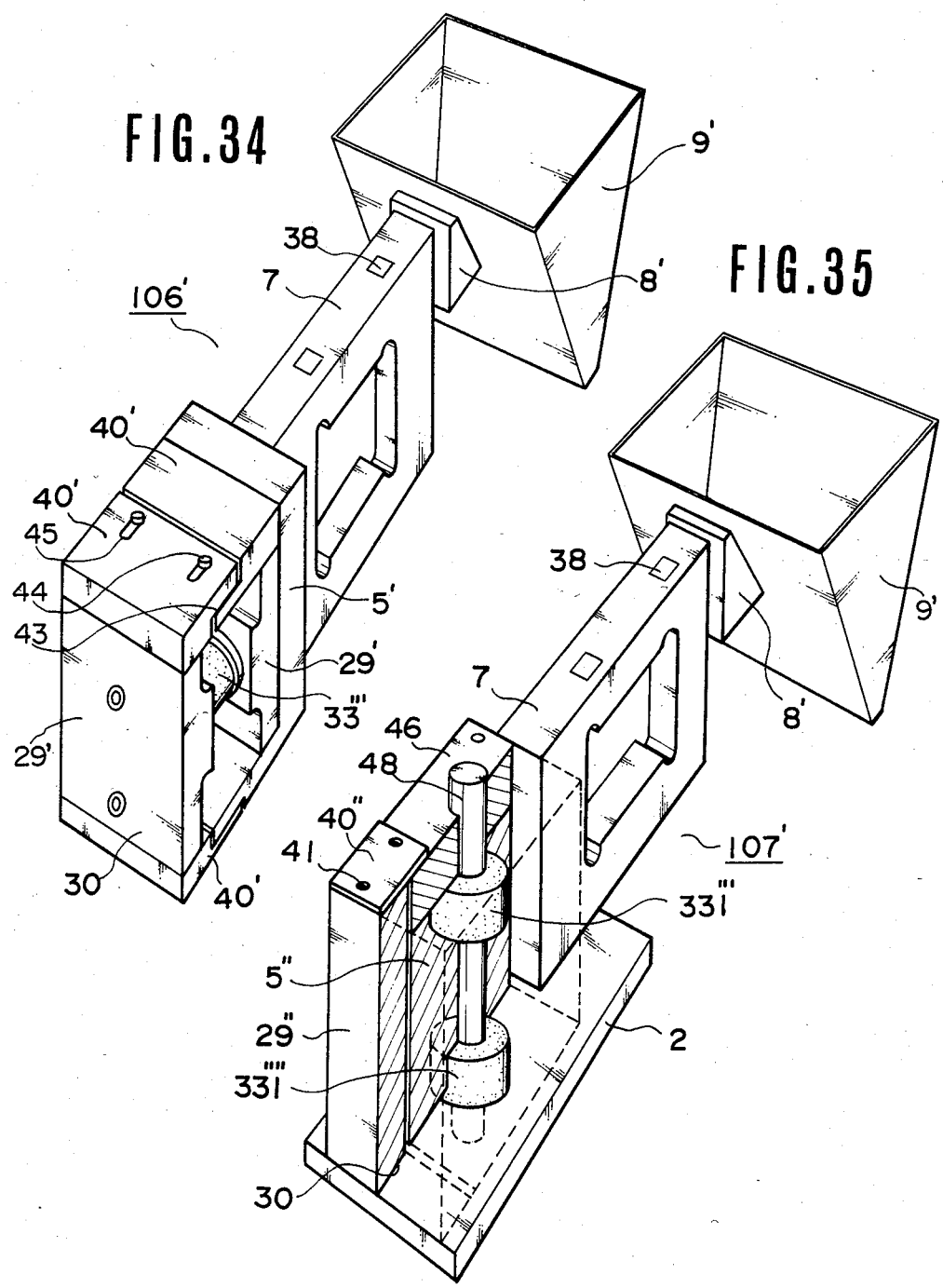

WEIGHING MACHINE WITH DUMMY LOAD CELL FOR ERROR CORRECTION

BACKGROUND OF THE INVENTION

1. Field of the Invention

This invention relates to a technique for improving weighing accuracy of a load cell which is used for indeterminate quantity weighing or determinate quantity weighing of granular goods or so in the distribution processes, etc.

2. Description of the Prior Art

As is known, various parts, goods, etc. are weighed in many industrial fields. For example, indeterminate quantity weighing is made for various parts in the manufacturing sections and determinate quantity weighing is made for many goods, in addition to indeterminate quantity weighing, in the distribution sections in order that weight of goods will not be insufficient with respect to the preset weight and an excessive amount will become minimum.

In either weighing practice, it is essential for these years to make weighing in an accurate, repeated and rapid manner, and weight of articles is determined based on the relative relationship between a loaded state of the articles and a weighing machine. It is practically possible to select a weighing machine which has accuracy necessary for weighing to be conducted at minimum, because the machine is an industrial product, but it is difficult to promptly grasp a loaded state of articles as a uniform state for regular weighing, because such a loaded state is very irregular depending on, e.g., the dropped or thrown-in condition of articles.

It was customary that the loaded state of articles to be weighed was neglected to some degree and such irregularities were corrected through calibration of the weighing machine.

For instance, a weighing machine disclosed in Japanese Utility Model Laid-Open No. 54-171368 is constructed as follows, as shown in attached FIG. 1. A weighing machine 1 has a frame 2 to which a pair of leaf springs 3, 3 are attached in parallel to each other, and a rebound leaf spring 4 is interposed therebetween. A bracket 5 as a support is attached to the distal end of those springs, and a load cell 7 is supported on the bracket pivotably in the horizontal direction through a buffer rubber 6 interposed therebetween. To the distal end of the load cell 7 there is attached through another buffer rubber 6 another support 8 pivotably, on the upper part of which is provided a receiving saucer 9 as a weighing member.

In such prior art weighing machine 1, as seen from the technique shown in said Laid-Open print, to avoid the occurrence of permanent strain, etc. in the load cell 7 when a thowing-in shock is applied to the receiving saucer 9 with the weighed material to be put thereon, a lateral shock is absorbed by the rubbers 6 to turn the load cell 7 in horizontal direction and a vertical shock is absorbed by the pair of springs 3, 3.

Another leaf spring 4 is arranged to press the upper leaf spring 3 thereby to vibrations of the leaf spring 3, but it is apparent that the spring 4 has substantially only a buffer function.

Probably, the reason is in that the leaf spring 4 produces friction resistance against the leaf spring 3 through pressing, but has no anti-vibration function due to elastic resistance.

In view of the above, an experiment model was manufactured for the conventional weighing machine as shown in FIG. 1 and measurement was conducted in such a state that the load was taken away in a moment. The result is shown in FIG. 2 in which the axis of abscissas represents time t and the axis of ordinates represents an amplitude a. As seen from FIG. 2, a damping characteristic is very inferior and vibrations will not be damped promptly, thereby leading to the disadvantage that a weighing signal from the load cell 7 will not exhibit the accurate weight value within a desired given time after throwing-in or loading of the materials to be weighed and a time characteristic for achieving stable weighing will become inferior.

It is, therefore, concluded from the above including the data shown in FIG. 2 that the conventional weighing machine 1 has not the anti-vibration effect substantially but just a buffer function alone.

To cope with this, weighing was made in the past with a filter of an analog circuit being set to have lower cut-off frequency as an expedient manner, thereby to cut the signal of higher frequency substantially as shown in FIG. 3. Measurement was started after the damping characteristic comes into a practically stabilized state with the lapse of a certain period.

Also as shown in FIG. 3, however, there exist in practice minute vibrations (later described) of lower frequency that are propagated from the base side and can not be eliminated by the filter. This was another reason of making it difficult to achive high-accurate weighing.

More specifically, a weighing line which requires weighing of high accuracy includes the following disadvantage. A base on which the weighing machine is installed undergoes the so-called complex base vibrations attributable to the associated the ground, building and mount, other weighing lines, the concerned line itself, etc. Those vibrations are transmitted and applied to the load cell, so that the load cell can not detect the weight in a stable manner.

In this way, despite it is essentially desired for a load cell incorporated in a weighing machine that vibrations are promptly damped when the materials to be weighed have been loaded by throwing-in or other steps, and that even if various base vibrations due to disturbance are present, these are eliminated and stabilized as soon as possible to permit immediate detection of proper weight, as shown in FIG. 4, the conventional weighing machine as mentioned above could not meet such conditions. Stated otherwise, the prior art weighing machine had a fatal defect that it can neither provide the anti-vibration effect, nor eliminate base vibrations, and it had just a buffer function of avoiding the occurrence of permanent strain.

To cope with this, there has been further proposed, for example, a method in which an additional dashpot or so is provided to absorb vibration energy with viscosity resistance for the purpose of damping disturbance vibrations promptly. In a transducer of such mechanism as including a load cell which undergoes very minute displacement and detecting the load based on deformation of a strain generator, however, design and manufacturing are very complicated which must be suitable in points of a displacement amount of the load cell, a displacement rate thereof and absorption energy so as to achive the sufficient effect by use of a damper, e.g., a dashpot, provided on the outside while keeping the desired weighing accuracy and sensitivity. This results in a problem that the foregoing dash pot or other dampers can not be installed in practice.

As previously noted, the conventional weighing machine also has the disadvantage that lateral vibrations are damped by the rubbers 6, but horizontal vibrations can not be restrained, thereby resulting in three-dimensional vibrations which impart a complex vibration phenomenon.

SUMMARY OF THE INVENTION

The invention of this application is intended to solve the foregoing problems of the conventional weighing machine, as a main technical subject, which has neither a damping function nor a base vibration removing function, and which has just a buffer function alone. An object of this invention is to provide a superior weighing machine which has a damping function of surely restraining vibrations while not lowering sensitivity of a load cell in its original function, thereby to permit stable weighing as prompt as possible, which can eliminate an influence of base vibrations upon the weighing machine, thereby to surely permit high-accuracy weighing, and hence which can be used with a beneficial result in a variety of industrial fields which require an weighing operation.

BRIEF DESCRIPTION OF THE DRAWINGS

FIGS. 19 and 20 are perspective views of other embodiments;

FIG. 21 is a partial perspective view showing an embodiment modified from that of FIG. 20;

FIG. 22 is a partially truncated perspective view of still another embodiment;

FIGS. 23, 24 and 25 are perspective views of other embodiments;

FIGS. 28, 29, 30, 31, 32, 33, 34 and 35 are views showing modified embodiments corresponding to those of FIGS. 17, 19, 20, 22, 23, 24, 25 and 26, respectively.

DESCRIPTION OF THE PREFERRED EMBODIMENTS

Figure 5:
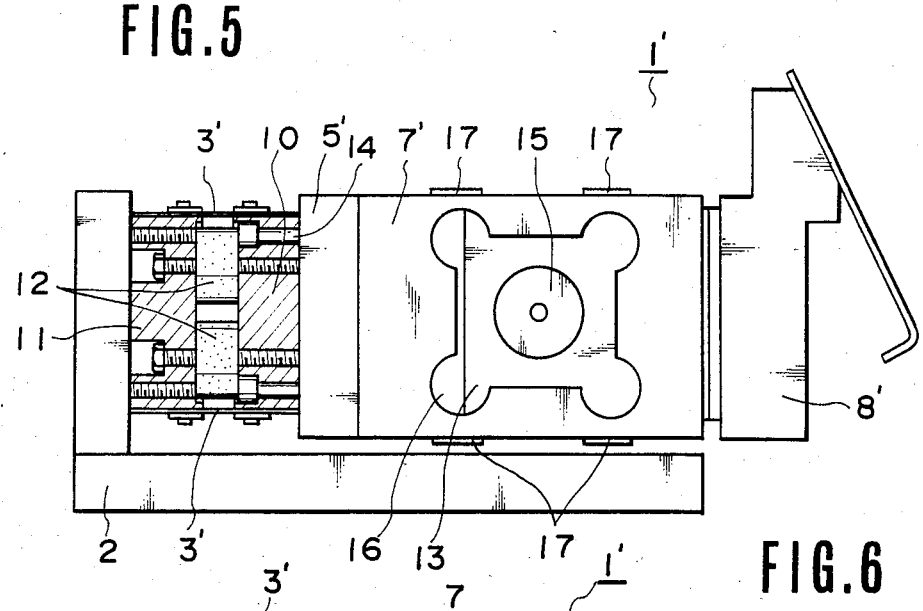
FIG. 5 is a partially sectioned side view, when looked in one lateral direction, of one embodiment of this invention.
Figure 6:
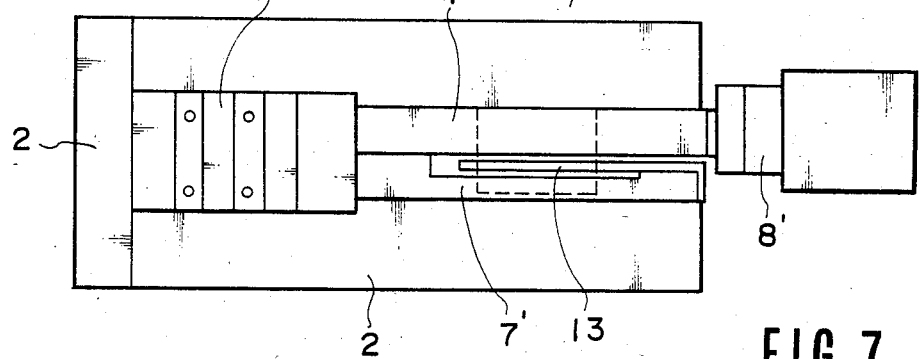
FIG. 6 is a top plan view thereof.
Figure 7:
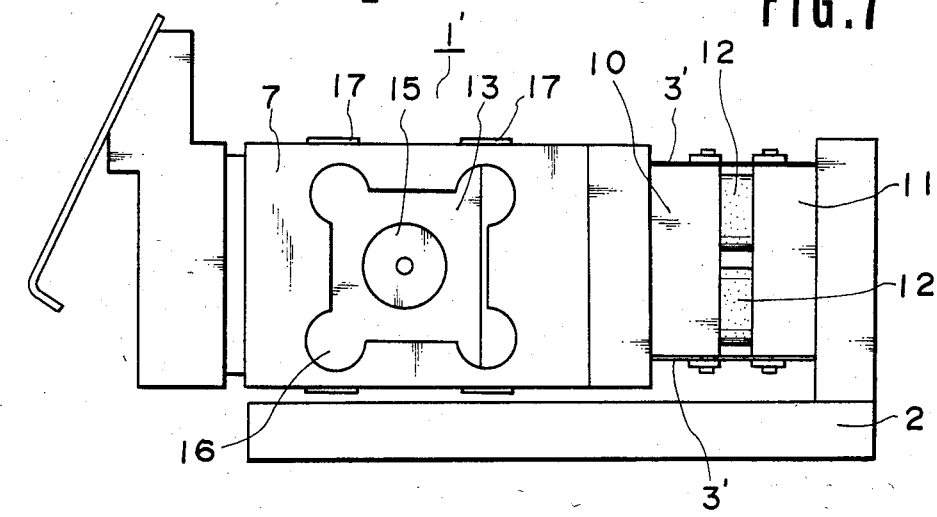
FIG. 7 is a side view thereof, when looked in the other lateral direction.
Figure 8:
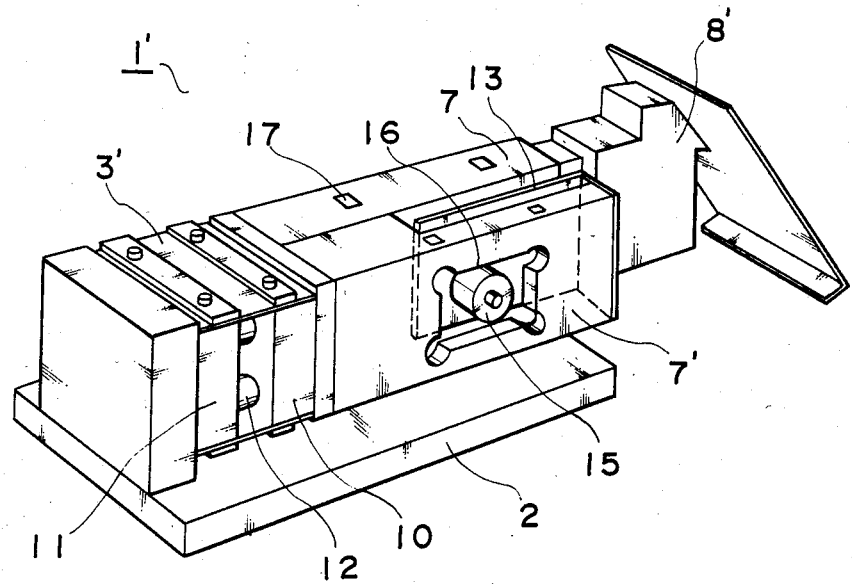
FIG. 8 is a perspective view thereof.

In an embodiment shown in FIGS. 5 to 8 (FIGS. 5 and 7 show side views when looked in the opposite directions), designated at 1' is a weighing machine which embodies spirit of the invention of this application. The illustrated machine, as part of a combined weighing machine, is designed to measure such as snack cakes, for instance, so that the measured goods have weight not insufficient with a minimum excessive amount to be packed in the same given weight for each pack. In outline, as is known, a support 8' engaged with a weighing hopper as a weighing member (not shown) is fixed to the distal end of a known load cell 7 on the loaded side, and the load cell 7 is fixed on the other side to a support 5' as specified.

The support 5' is attached to a frame 2 in a cantilever fashion which in turn is attached to another frame, as specified, constituting a skeleton of the not-shown combined weighing machine. At the time of the former attaching, as is illustrated, two antivibration rubbers 12, 12 as dampers superior in damping performance due to internal friction are centrally provided at upper and lower positions, and the frame 2 is coupled to the support 5' through a pair of right and left brackets 10, 11 fixed to face each other, so that the load cell 7 is mounted in a cantilever fashion.

Both leaf springs 3', 3' are fixedly bolted to each of the upper and lower surfaces of the brackets 10, 11, causing the load cell 7 to be constrained and displaced as one type of parallel link with respect the frame 2.

Further, as shown in FIG. 6, a dummy load cell 7' is attached by means of screws 14 likewise in a cantilever fashion to the front surface of the support 5' at a position offset to one side. To the distal end of the dummy load cell 7' is a support plate 13 which locates in a space between the load cell 7 and the dummy load cell 7', so that it makes no interference with the opposite inner surfaces of the load cell 7 and the dummy load cell 7' with a minute clearance between the support plate and either inner surface.

A dummy mass 15 is fitted to the support plate 13 in an exchangeable manner so as to face frame holes 16 of the load cell 7 and the dummy load cell 7'.

The dummy mass 15 has weight so selected that the dummy load cell 7' exhibits the same natural frequency as that produced in the load cell 7 owing to vibratory weight given by weight of the load cell 7 and unloaded weight of the aforesaid weighing hopper engaged with the load cell 7 through the support 8'. Accordingly, if one type weighing hopper is exchanged by another type with respect to the load cell 7 unchanged and hence the resultant vibratory weight is varied, the dummy mass 15 is also exchanged by another one correspondingly, so that natural frequency of the dummy load cell 7' becomes equal to that of the load cell 7 at all times, thereby making it possible for both cells to output the same signal in accordance with base vibrations.

Moreover, designated at 17, 17 are strain gauges which are adhesively fixed to the load cell 7 and the dummy cell 7', respectively. As with the prior art, those strain gauges are electrically connected to a control circuit of a microcomputer (not shown), which receives both a detected weight signal for the weighing hopper issued from the load cell 7 and a detected weight signal for the dummy mass issued from the dummy load cell 7'. Because an output signal due to various base vibrations transmitted from a base (not shown) through the frame 2 is added to both weight signals, the fluctuating factor due to the base vibrations is eliminated by subtracting the weight signal detected by the dummy load cell 7' from the weight signal detected by the load cell 7 in a certain arithmetic circuit, so that the net weight can be measured easily.

In the arrangement as mentioned above, when the combined weighing machine is operated and the materials to be weighed are thrown in the weighing hopper, the attendant throwing-in energy causes the load cell 7 supported on the frame 2 in a cantilever fashion to be vibrated at its own natural frequency, and the detection signal from the load cell 7 is input to the microcomputer (not shown) as previously noted.

During this period, base vibrations are being transmitted and applied through the frame 2 from the base to both the load cell 7 and dummy cell 7' unavoidably.

Therefore, the detection signal detected by the load cell and input to the microcomputer includes a disturbance vibration signal due to throwing-in of the weighed materials transmitted from the weighing hopper, a base vibration signal as well as the weight signal resulted from the weighed materials together.

It is a matter of course that, since the dummy load cell 7' has the dummy mass 15, whose vibratory weight is equal to that of the load cell 7 except for the weighed materials, and hence it vibrates at the same natural frequency as the load cell 7, the detection signal detected by the dummy load cell 7' is just an output signal due to base vibrations which is applied to the microcomputer.

The microcomputer always makes an arithmetic operation so as to eliminate the output signal due to base vibrations detected by the dummy load cell 7' from the detection signal detected by the load cell 7.

Figure 1:
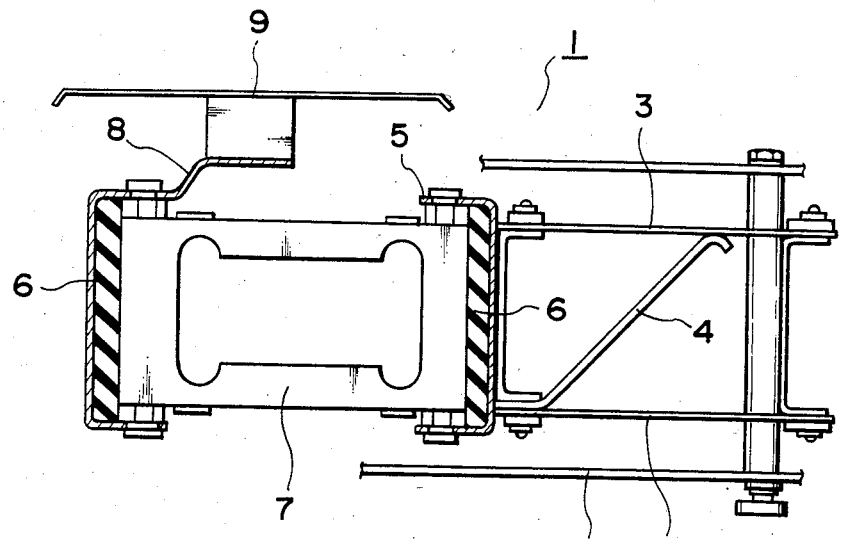
FIG. 1 is a partially sectioned side view of a weighing machine according to the prior art.
Figure 2:
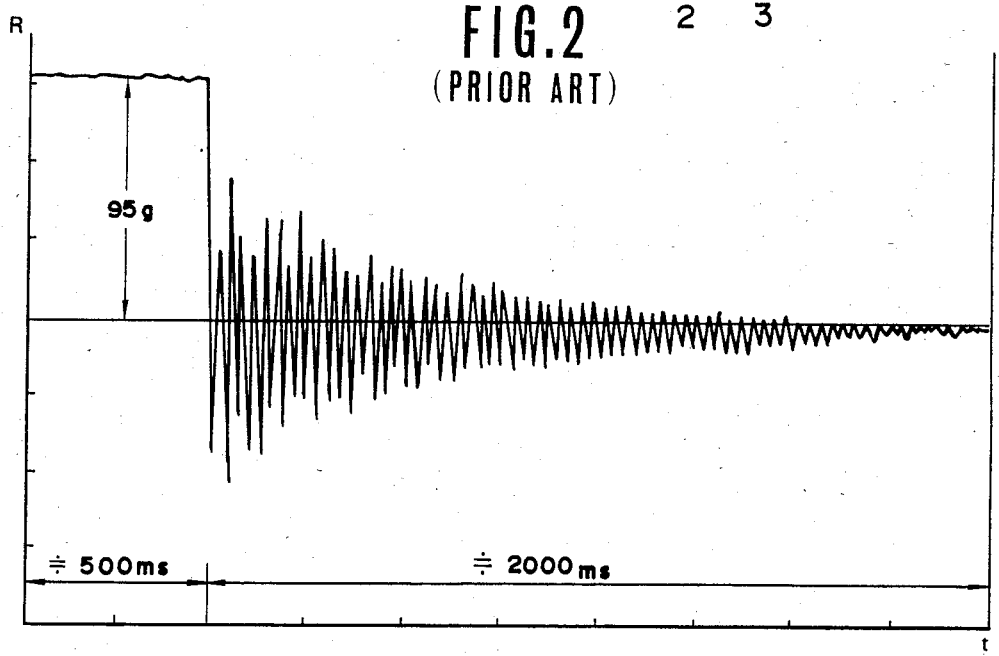
FIG. 2 is a chart showing a damping characteristic of vibrations in the weighing machine according to the prior art.
Figure 3:
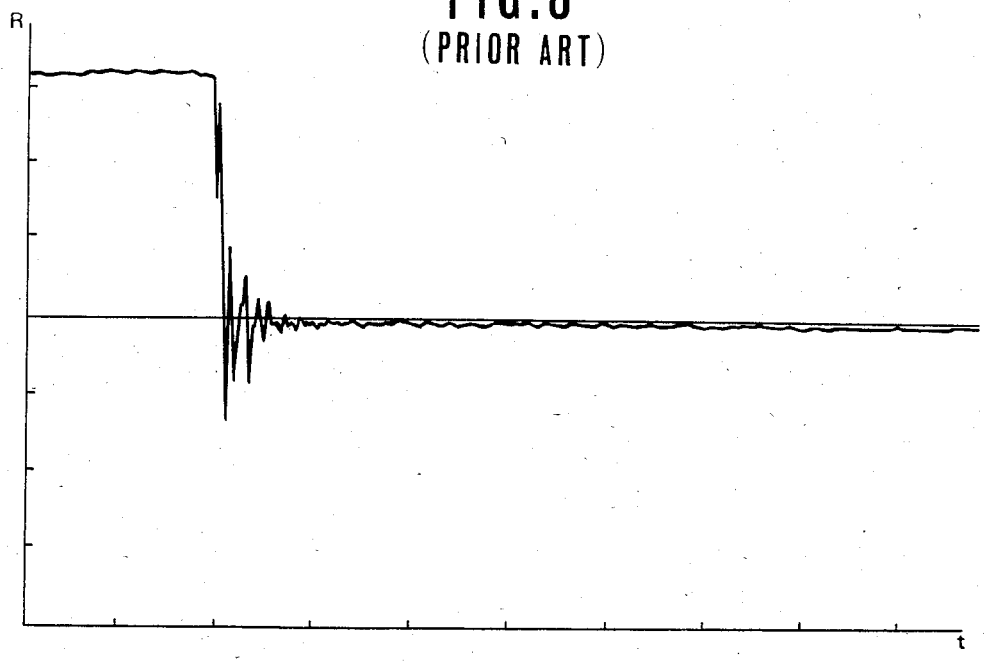
FIG. 3 is a chart showing a damping characteristic of vibrations in case of using an associated filter according to the prior art.
Figure 4:
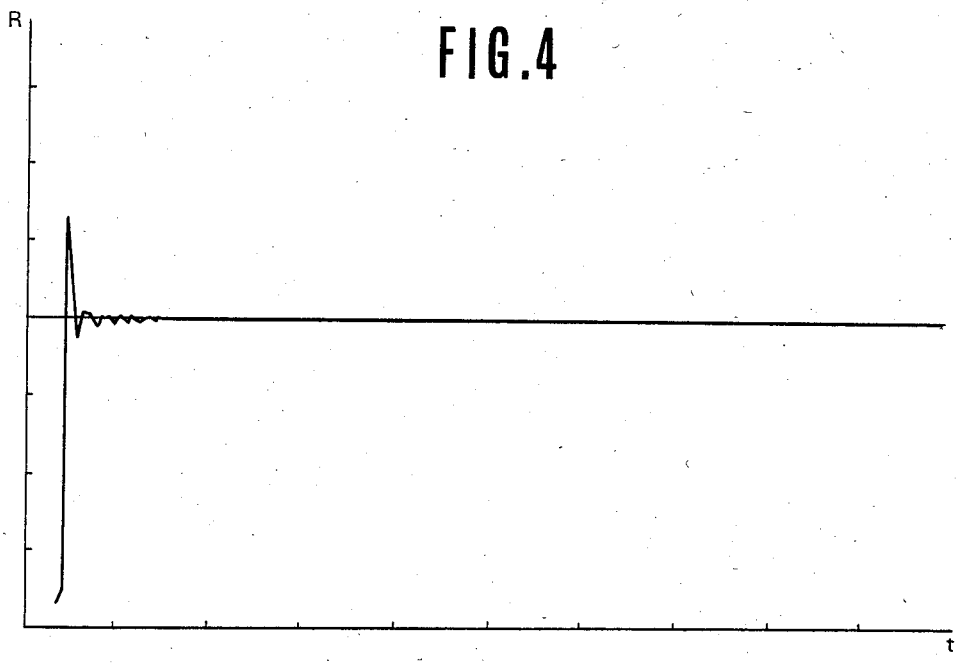
FIG. 4 is a chart showing a damping characteristic of vibrations in a weighing machine according to this invention in which base vibrations are cancelled.

Further, since the load cell 7 is made integral with the support 5' and the bracket 10 and then supported in a cantilever fashion on the frame 12 integral with the branket 11 through the anti-vibration rubbers 12, 12 as an anti-vibration damper on one side thereof, the damping action produced with an anti-vibration function due to internal friction attendant on deformation of the anti-vibration rubbers 12, 12 causes vibrations of the load cell 7 to be damped promptly, as shown in FIG. 4. In addition, since fluctuations due to base vibrations is always eliminated with the aid of the dummy load cell 7', the detection signal from the load cell 7 is quickly stabilized (after the arithmetic operation of cancellation, in practice).

Then, the weighing hopper is opened under a certain arithmetic control and the weighed materials are transferred to the package process of next step.

In this connection, vibrations of both the load cell 7 and dummy load cell 7' are damped with internal friction attendant on deformation of the anti-vibration rubbers 12, 12, but, at this time, it is undesired for the rubbers to displace non-parallel relative to the bracket 11. From this reason, the leaf springs 3', 3' attached to the upper and lower surfaces of the brackets 10, 11 ensures that vibrations of both the load cess 7 and dummy load cell 7' are damped in parallel displacement relation relative to the frame.

Figure 9:
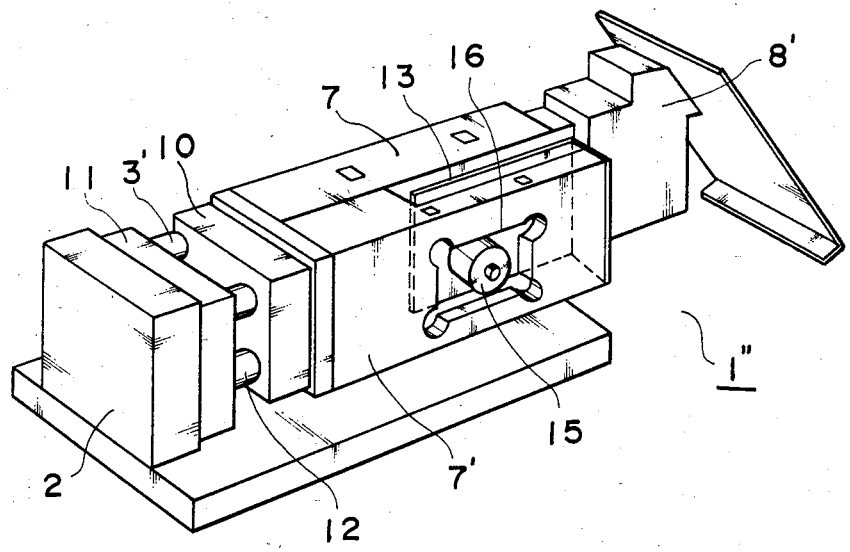
FIG. 9 is a perspective view of another embodiment.

In case of such design form that internal friction attendant on deformation of the anti-vibration rubbers 12, 12 is enough to maintain substantially parallel displacement of damped vibrations of both the load cell 7 ad dummy load cell 7' without adversely affecting weighing effected by the load cell 7, only two or four anti-vibration rubbers 12, 12, . . . may be interposed between the brackets 10 and 11 and bridges of the leaf springs 3', 3' can be dispensed with, as shown in FIG. 9. As an alternative, it is also possible to provide a bridge of the leaf spring 3' only on the upper surface of the brackets 10, 11.

Meanwhile, the weighing machine is sometimes required to precisely measure chemicals, counterweigts, radioactive materials, etc. in very minute weight units. In case of handling such important materials, e.g., in case of precise weighing for counterweight check, the base of mount on which the weighing machine is supported on has often aseismatic structre, and the associated building or foundation has also often rigid structure such that a thickness of concrete or an amount of iron reinforcing rods are selected to be larger the whole structure is separated from the surrounding ground through partition grooves to be isolated from ground vibrations and to undergo substantially no vibration. When installing the weighing machine in such building, the dummy load cell 7' used in the foregoing embodiments is not necessarily required to be provided and only just anti-vibration damper may be provided for the load cell 7 in some cases. In those cases, as shown in FIG. 10, it becomes possible to remove the dummy load cell 7' from the embodiment of FIG. 8 and attach only the load cell 7 to the distal end of the support 5' in a cantilever fashion.

Figure 10:
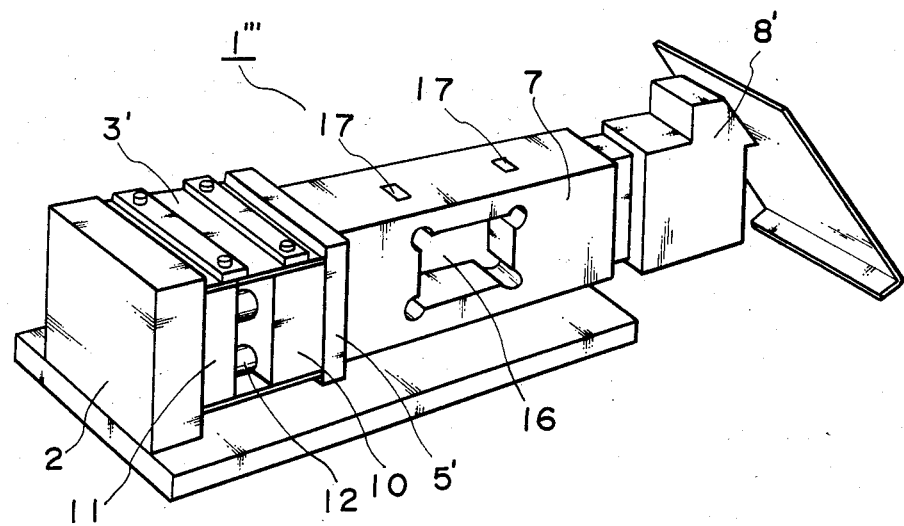
FIG. 10 is a perspective view of different embodiment.

Stated differently, this embodiment is arranged as follows as shown in FIG. 10. The leaf springs 3', 3' are bridged between the bracket 10 attached to the support 5' and the bracket 11 to the frame 2 at the upper and lower parts thereof, and the plurality of anti-vibration rubbers 12, 12, . . . are connected to provide a damping function due to internal friction of the anti-vibration rubbers 12, 12 . . . , thereby making it possible to perform stable weight detection promptly.

Figure 11:
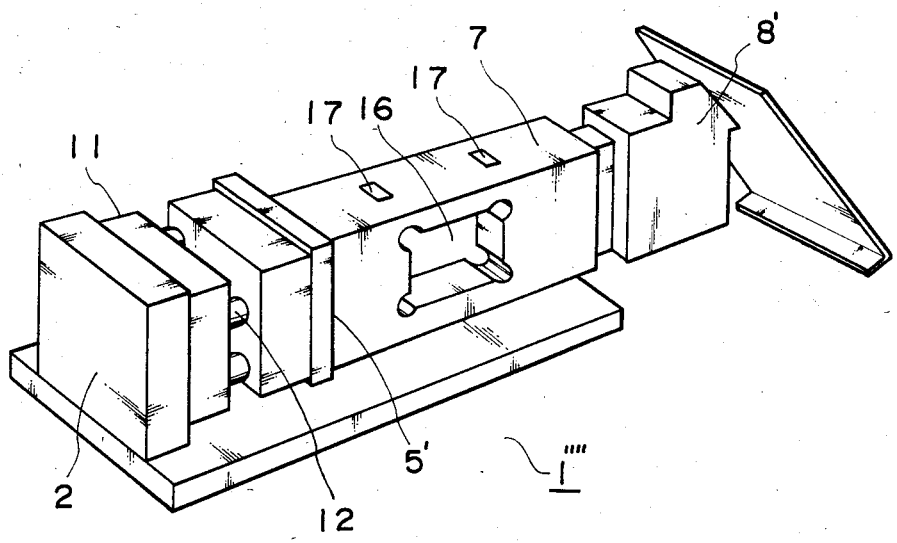
FIG. 11 is a perspective view of still another embodiment.

Further, in case vibration displacement of the load cell 7 is held in a parallel state relative to the frame 2, the leaf springs 3', 3' may be dispensed with as shown in FIG. 11, or either of them may be provided only on the upper side.

As previously noted, the invention of this application has such a basic subject that, unlike the conventional one-freedom system in which weighing is made based on natural frequency of the load cell, the load cell is supported on the frame through the anti-vibration damper to provide a two-freedom system in which internal friction of the anti-vibration damper functions to restrain vibrations, whereby a transmission characteristic of natural frequency in the system of weighing section is improved to enable rapid damping for promoting anti-vibration at the time of loading the materials to be weighed and for reacing the stabilized period as early as possible.

Incidentially, although a dashpot utilizing viscosity resistance, e.g., an oil damper, is basically used as an anti-vibration damper, the anti-vibration rubbers having internal friction equivalent to such viscosity resistance are employed herein to facilitate design and manufacture as well as to lower the cost, because the oil damper has difficulty in its design and manufacture.

Figure 12:
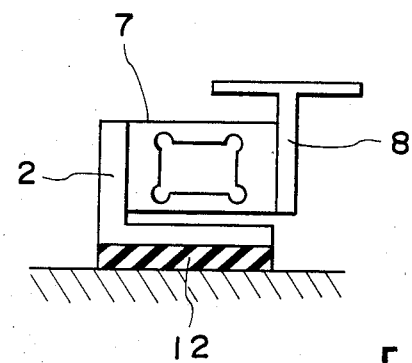
FIGS. 12 to 14 are schematic side views of still other embodiments.
Figure 13:
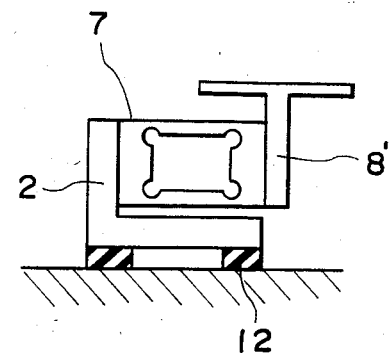
Figure 14:
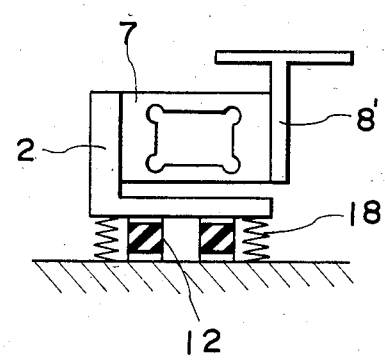

Moreover, the arrangement forms of the antivibration damper provided independently of displacement of the load cell are not limited to the foregoing embodiments. For example, as shown in FIG. 12, the the frame 2 may be rested on a machine frame with the anti-vibration damper 12 being arranged under the frame 2. Alternatively, as with an embodiment shown in FIG. 13, a plurality of anti-vibration dampers may be arranged under the frame 2. Further, as with an embodiment shown in FIG. 14, coils 18 may be provided under the frame 2 in addition to the plurality of anti-vibration dampers.

Figure 15:
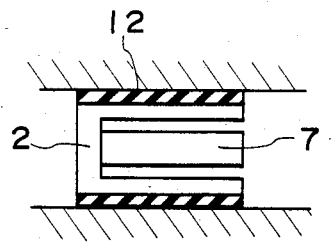
FIGS. 15 and 16 are schematic top plan views of still other embodiments.
Figure 16:
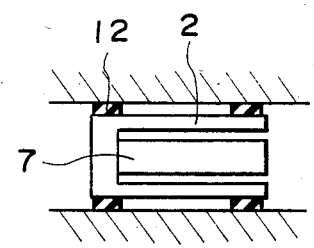

As an alternative, the frame 2 for directly supporting the load cell 7 in a canti-lever fashion may be supported at both sides thereof on the machine frame through the anti-vibration dampers 12, as shown in FIG. 15. Moreover, as with an embodiment shown in FIG. 16, the frame 2 may be supported at each side thereof on the machine frame through the plurality of anti-vibration dampers 12.

Figure 17:
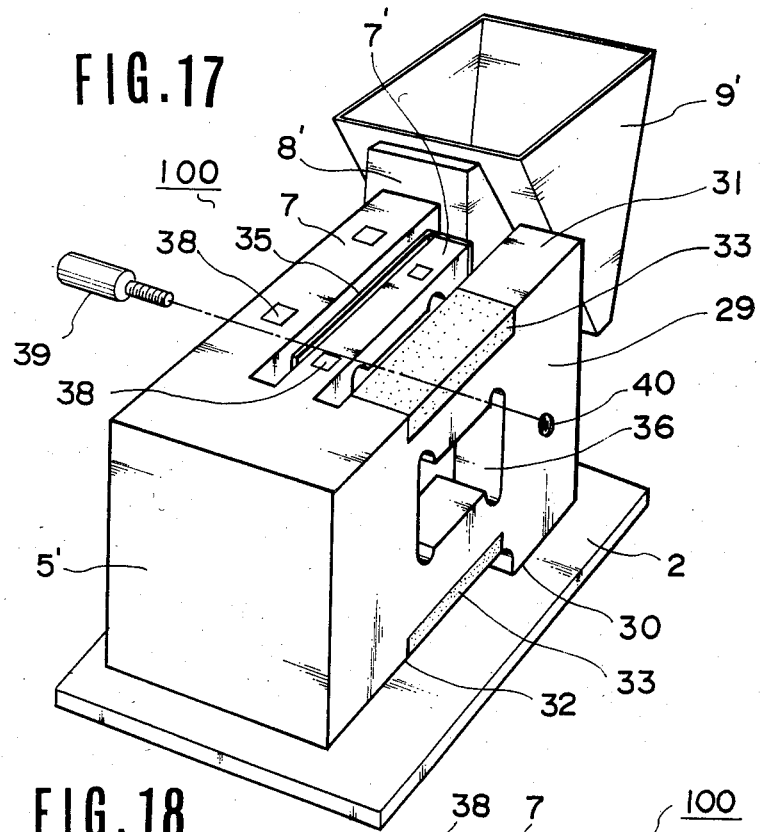
FIG. 17 is a perspective view of another embodiment.
Figure 18:
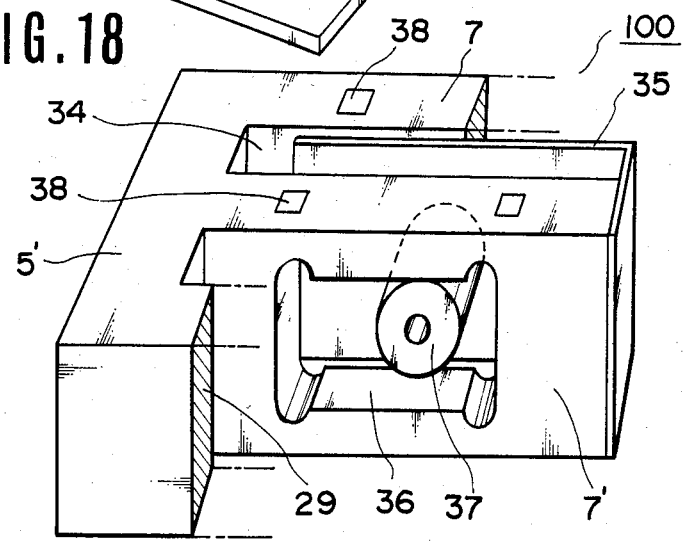
FIG. 18 is a perspective view thereof with a part truncated.

Referring now to an embodiment shown in FIGS. 17 and 18, designated at 100 is a weighing machine which embodies spirit of the invention of this application. The illustrated form is intended, as a weight detector of a combined weighing machine, to measure weight of materials in the form of granular goods such as snack cakes, for instance, so that the measured goods have weight not insufficient with a minimum excessive amount to be packed into a bag made of, e.g., polyethylene, in the same given weight for each bag. In basic outline, as is known, a support 8' engaged with a weighing hopper 9' as a weighing member is fixed to the distal end of a known load cell 7 on the loaded side, and the load cell 7 is integrally fixed on the other side to a support 5'. Further, the support 5' extends parallel to the load cell 7 is integrally fixed to the end of a strain generator 29 having the substantially same form as the load cell 7 and comprising a parallel leaf spring (Roberval's mechanism).

Meanwhile, a proximal supporting face 30 of the strain generator 29 is attached to the frame 2 constituting a skelton (not shown) of the combined weighing machine in a cantilever fashion through any appropriate means.

Accordingly, the support 5' interconnecting between the strain generator 29 and the load cell 7 has a certain spacing at its bottom surface relative to the frame 2.

As seen from the figure, on the intermediate upper and lower surfaces 31, 32 of the strain generator 29 there are fixed two anti-vibration rubbers 33, 33 of given size using adhesives, for example, which rubbers serve as an anti-vibration damper having internal friction superior in damping performance.

Also as seen from the figures, a dummy cell 7' is integrally fixed to the inner surface of the support 5' so as to extend therefrom in a similar cantilever fashion, and a support plate 35 is attached to the distal end of the dummy cell 7', the support plate 35 being bent to return back into a space 34 between the load cell 7 and the dummy cell 7'. With this arrangement, there is formed a space with minute clearances effective to avoid interference the inner side faces of the load cell 7 and the dummy cell 7' opposite to each other.

Incidentially, a dummy mass 37 is fitted to the support plate 35 in an exchangeable manner to face both hollow portions 36 of the load cell 7 and dummy cell 7'.

The dummy mass 37 has weight so selected that the dummy cell 7' exhibits the same natural frequency as that produced owing to vibratory weight given by weight of both the load cell 7 and the aforesaid weighing hopper 9' engaged with the load cell 7 through the support 8'. Accordingly, if one type weighing hopper 9' is exchanged by another type with respect to the load cell 7 unchanged and hence the resultant vibratory weight is varied, the dummy mass 37 is also exchanged by another one correspondingly, so that natural frequency of the dummy cell 7' becomes equal to that of the load cell 7 at all times, thereby making it possible for both cells to output the same signal in accordance with base vibrations propagated to the weighing machine 100 through the frame 2.

Moreover, designated at 38, 38 are strain gauges which are adhesively fixed to the upper and lower surfaces of the load cell 7 and the dummy cell 7'. As with the prior art, these strain gauges are electrically connected to amplification circuits (not shown), which receive respectively a detected weight signal for the weighing hopper 9' issued from the load cell 7 and a detected weight signal for the dummy mass 37 issued from the dummy cell 7'. Because an output signal due to the aforesaid various base vibrations transmitted from a base (not shown) through the frame 2 is added to both weight signals, the fluctuating factor due to the base vibrations is eliminated by subtracting the weight signal detected by the dummy cell 7' from the weight signal detected by the load cell 7 in a certain arithmetic circuit, so that the net weight can be measured surely.

Besides, designated at 39 is a stopper which is screwed into a threaded hole 40 in the strain generator 29 from the side of load cell 7 through stopper holes (not shown) formed in both the load cell 7 and dummy cell 7', and which serves as a common protective stopper against an overload.

In the arrangement as mentioned above, when the combined weighing machine is operated as specified and the materials to be weighed are thrown in the weighing hopper 9', the attendant throwing-in shock causes the load cell 7 supported on the frame 2 in a cantilever fashion through the support 5' at the strain generator 29 to be first vibrated vertically at its own natural frequency with the Roberval's mechanism of the strain generator 29, and the detection signal from the load cell 7 is input to an arithmetic circuit via the amplification circuit (not shown) as previouly stated.

During this period, base vibrations are being unavoidably transmitted and applied to both the load cell 7 and dummy cell 7' from a frame of the combined weighing machine through the frame 2 and the strain generator 29.

Therefore, the detection signal detected by the load cell 7 and input to the arithmetic circuit includes a disturbance vibration signal due to throwing-in of the weighed materials transmitted from the weighing hopper 9', a base vibration signal as well as the weight signal resulted from the weighed materials together.

In this way, since the dummy cell 7' has the dummy mass 37, whose vibratory weight is equal to that of the load cell 7 as previously noted, and hence it renders a vibration system having the same natural frequency as the load cell 7, the detection signal detected by the dummy cell 7' is just an output signal due to base vibrations which is then applied to the arithmetic circuit through the amplification circuit.

The arithmetic circuit always makes an arithmetic operation so as to eliminate the input signal due to base vibrations detected by the dummy cell 7' from the detection signal detected by the load cell 7.

Further, since the load cell 7 is integrally connected to the strain generator 29 through the support 5' on one side thereof, and since the anti-vibration rubbers 33, 33 as an anti-vibration damper are attached to the upper and lower surfaces 31, 32 of the strain generator 29, the damping action produced with an anti-vibration function due to internal friction energy attendant on deformation of the anti-vibration rubbers 33, 33 at the time of loading as well as metallic elasticity of the strain generator 29 causes vibrations of the load cell 7 to be damped promptly, as shown in FIG. 4. In addition, since fluctuations due to base vibrations is always eliminated with the aid of the dummy cell 7', the detection signal after the arithmetic operation is quickly stabilized through cooperation with the above effect.

Then, a cover of the weighing hopper 9' is opened under a certain arithmetic control and the weighed materials are transferred to the package process of next step.

In this connection, vibrations of both the load cell 7 and dummy cell 7' are damped with metallic elasticity of the strain generator 29 as well as internal friction attendant on deformation of the anti-vibration rubbers 33, 33, and, at this time, damped vibrations of both the load cell 7 and dummy cell 7' are controlled to occur in a parallel displacement manner through two parallel metallic bridges constituting a Roberval's mechanism at the part of the strain generator 29 between the support 5' and the supported portion 40 on the frame 2, to which the anti-vibration rubbers 33, 33 are fixed.

A variety of modified design forms are possible which meet such conditions that vibrations of both the load cell 7 and dummy cell 7' are damped with metallic elasticity of the strain generator 29 and internal friction energy attendant on deformation of the anti-vibration rubbers 33, 33, and parallel displacement of the damped vibrations in the vertical direction is substantially maintained through supporting of both cells on the upper and lower surface portions 31, 32 of the strain generator 29 on one side thereof. Those modified forms will be now described with reference to embodiments shown in FIG. 7 and the subsequent figures.

First, in a weighing machine 101 according to an embodiment shown in FIG. 19, the support 5' integrally supporting the load cell 7 also integrally supports the dummy cell 7' in a cantilever fashion as with the foregoing embodiment, and it further integrally supports strain generators 29, 29 as a Roberval's mechanism extending parallel to the load cell 7 and the dummy cell 7' on both sides thereof. The strain generators 29, 29 are attached to and supported on the frame 2 as specified at their lower ends on the side of the weighing hopper 9' through respective supporting surfaces 30, 30, while a square pillar-shaped anti-vibration rubber 33' as an anti-vibration damper is integrally interposed between the under face of the support 5' and the frame 2.

In this embodiment, therefore, the strain generators 29, 29 ensure vertical parallel displacement of vibrations and damping of both the load cell 7 and dummy cell 7' due to loading on the weighing hopper 9', and the damping action due to metallic elasticity of the strain generators 29 and the anti-vibration rubber 33' as an anti-vibration damper as well as absorption of base vibrations are effected similarly to the above mentioned embodiment.

It is to be noted that, in this embodiment, one of the strain generators 29, 29 may be dispensed with to leave only the remaining one on either side depending on design.

Further, in a weighing machine 102 according to an embodiment shown in FIG. 20, both the load cell 7 and the dummy cell 7' are integrally supported on the support 5' in a cantilever fashion, which in turn is integrally attached to the frame 2 (not shown) through the strain generator 29 at the rear surface thereof. An anti-vibration rubber 331 as an anti-vibration damper is incorporated within the strain generator 29 in a fully filled state. Both the load cell 7 and dummy cell 7' are capable of undergoing parallel displacement in the vertical direction through the strain generator 29, and vibrations thereof are damped with metallic elasticity of the strain generator 29 and internal friction energy of the anti-vibration rubber 33'.

It is thus ensured also in this embodiment that vibrations due to a shock attendant on throw-in loading of the weighed materials on the weighing hopper 9' are damped promptly and base vibrations are eliminated surely with the aid of the dummy cell 7'.

An embodiment shown in FIG. 21 is obtained by modifying the embodiment of FIG. 20 in design such that a through hole 39 is laterally formed in the anti-vibration rubber 331 as an anti-vibration damper of FIG. 20 to provide an anti-vibration rubber 331', for the purpose of reducing the weight. The resultant effect remains substantially unchanged as compared with the foregoing embodiment.

Meanwhile, even if the upper and lower bridges of the strain generator displaceable parallel are formed of a pair of leaf springs, there causes no substantial change on the Roberval's mechanism in its function as a vertical vibration system and a strain system. In a weighing machine 103 according to an embodiment shown in FIG. 22, therefore, the strain generator to which attached integrally both the load cell 7 and dummy cell 7' is divided into front and rear halves 29', 29'. Parallel leaf springs 40, 40 constituting upper and lower bridges between the divided strain generators 29', 29' are integrally attached to the upper and lower surfaces of the strain generators by means of screws 41, 41, thereby enabling parallel displacement in the vertical direction. In addition, a block-like anti-vibration rubber 331" as an anti-vibration damper is filled in a space defined by the strain generators 29', 29' and the parallel leaf springs 40, 40 or held fixedly therebetween.

Incidentially, the rear face of the strain generator 29' on the back side serves as a supporting surface 30 through which it is supported on the frame 2 (not shown).

It is also ensured in this embodiment that both the load cell 7 and dummy cell 7' undergo parallel displacement in the vertical direction, vibrations thereof occurred at the time of throwing the weighed materials into the weighing hopper 9' are damped as quick as possible with the anti-vibration rubber 331", and base vibrations are eliminated with the aid of the dummy cell 7'.

In a weighing machine 104 according to an embodiment shown in FIG. 23, the dummy cell 7' is integrally connected to the load cell 7 through a bridge 42, and the load cell 7 is attached to the frame 2 through the strain generator 29 at its supporting surface 30 of the latter, so that the dummy cell 7' is also dynamically supported on the frame 2 through the bridge 42 and the strain generator 29. In addition, a support 5' is integrally extended from the bridge 42 rearward, and a compression type anti-vibration rubber 33" as an anti-vibration damper is interposed between the support 5' and a support 5"

attached to the frame 2 through another supporting surface 30 which is disposed in parallel to the supporting surface 30 of the strain generator 29 for the load cell 7. In this embodiment, therefore, the strain generator 29 and the anti-vibration rubber 33" as an anti-vibration damper are provided in parallel so that weight of the weighed materials imposed on the load cell is borne by the frame through the strain generator 29 and vibrations in this system are damped with the anti-vibration rubber 33", and further base vibrations are eliminated with the aid of the dummy cell 7' which receive them through the strain generator 29.

FIG. 24 shows another embodiment which employs a compression type anti-vibration rubber similar to the anti-vibration rubber 33" used in the embodiment of FIG. 23. In a weighing machine 105 according to the embodiment shown in FIG. 24, both the load cell 7 and dummy cell 7' are integrally attached to the support 5' at their proximal ends, and the support 5' is in turn integrally attached to one of the strain generators 29', 29' on the front side which have the form of and are arranged in a vertically reversed relation. The parallel leaf springs 40, 40 are integrally attached to the upper and lower surfaces of the strain generators 29', 29' by means of bolts 41, 41. Further, the other of the strain generators 29', 29' on the proximal side is integrally attached to the frame 2 (not shown) through the supporting surface 30, and an anti-vibration rubber 33' as an anti-vibration damper of compression type is disposed in a space defined by both the strain generators 29', 29'. In this embodiment, weight of the weighing hopper 9' is transmitted to the frame 2 through the support 5', strain generators 29', 29' and the parallel leaf springs 40, 40, vibrations occurred at the time of throwing the weighed materials into the weighing hopper are damped with the anti-vibration rubber 33', and base vibrations are eliminated with the aid of the dummy cell 7' in a manner as before.

FIG. 25 shows another embodiment which has a function of vertical parallel displacement comparable to that of the parallel leaf springs 40, 40 attached to the strain generators 29', 29' in the above embodiment. In a weighing machine 106 according to the embodiment shown in FIG. 25, upper and lower bridges between the pair of strain generators 29', 29' include joggled lap joints 43, 43 which permit adjustable positioning by means of bolts 44 and elongated slots 45, and the paired strain generators 29', 29' are interconnected through two pairs of parallel blocks 40', 40' which are constrained to be unmovable in the lateral direction and which are able to displaced only in the vertical direction. The rear strain generator 29' has the supporting surface 30 through which it is fixed to the frame (not shown), while the front strain generator 29' has the supporting surface for the support 5' to which are integrally attached both the load cell 7 and dummy cell 7'. An anti-vibration rubber 33''' as an anti-vibration damper is interposed between the pair of strain generators 29' and 29' in the lengthwise direction as a shear type anti-vibration rubber. In this embodiment, therefore, the load cell 7 and the dummy cell 7' are supported to be displaceable in the vertical direction so that base vibrations are transmitted to the dummy cell 7' through strain generators 29', 29' and blocks 40', 40' for cancellation, and vibrations occurred at the time of throwing the weighed materials into the weighing hopper are damped with the anti-vibration rubber 33''' through its shear resistance.

Figure 26:
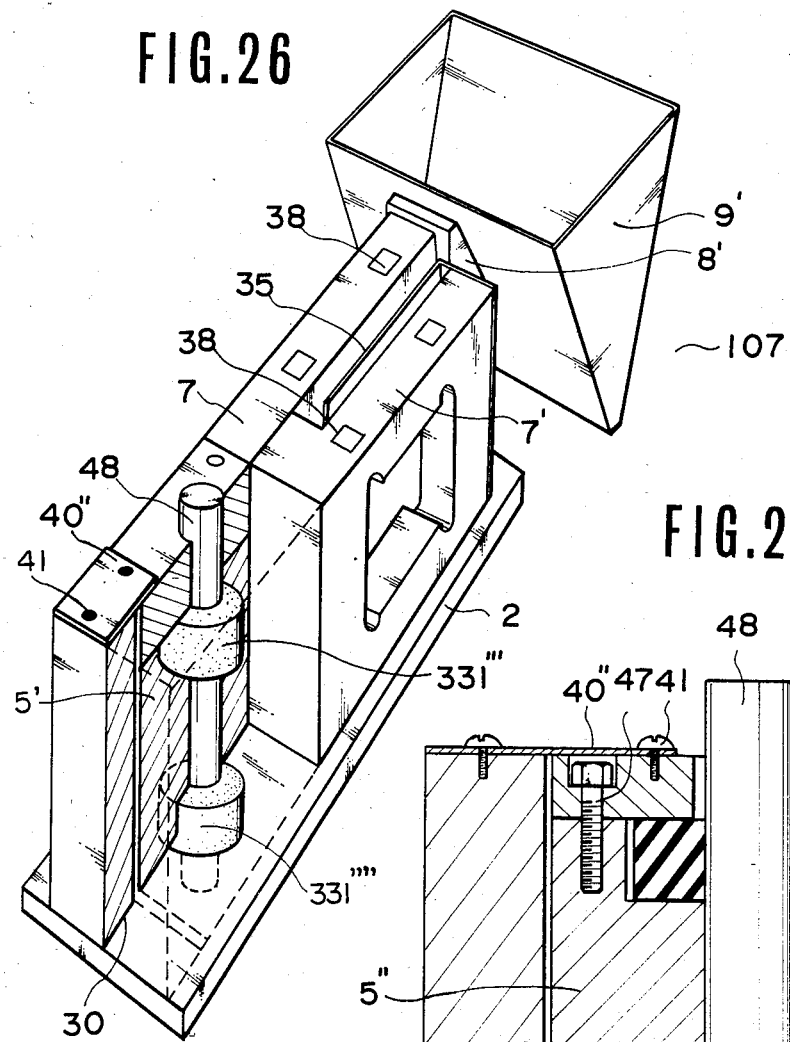
FIG. 26 is a partially truncated perspective view of still another embodiment.
Figure 27:
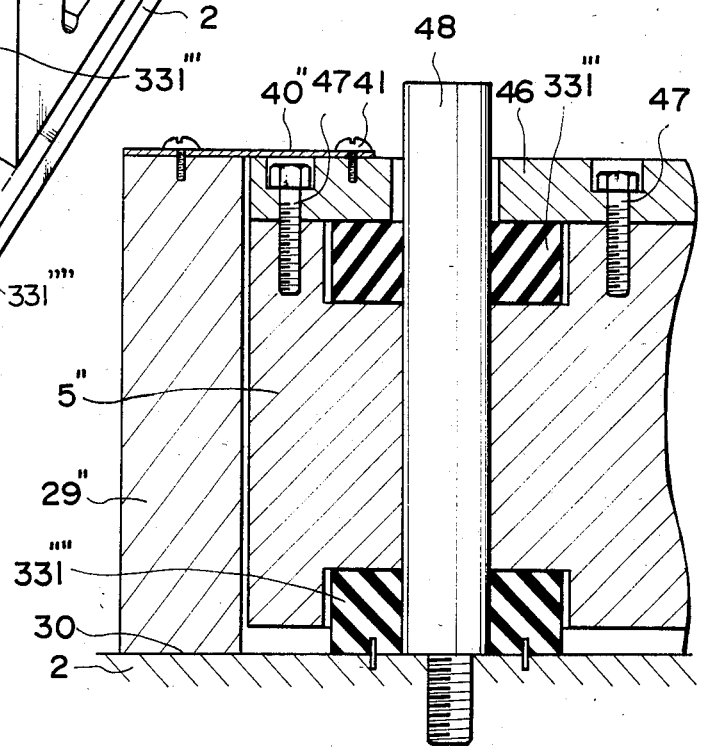
FIG. 27 is a sectional view of a part of FIG. 26.

Next, in a weighing machine 107 according to an embodiment shown in FIGS. 26 and 27, both the load cell 7 and dummy cell 7' are integrally attached to a support 5" at their proximal ends, and a block 46 is integrally attached to the upper surface of the support 5" by means of bolts 47, 47. A compression type anti-vibration rubber 331''' as an anti-vibration damper is interposed between the support 5" and the block 46, and likewise another anti-vibration rubber 331'''' of compression type is interposed between the support 5" and the frame 2. A guide bar 48 fixedly screwed at its lower end into the frame 2 is fitted to pass through those four members. Further, a leaf spring 40" is integrally fixed by means of screws 41, 41 between the rear upper surface of the block 46 and the upper surface of a strain generator 29" which is fixedly attached to the frame 2 through its supporting surface 30.

Incidentally, the anti-vibration rubber 331''' interposed at the upper position is integrally attached to the guide bar 48 at a given height, while the anti-vibration rubber 331'''' interposed at the lower position receives the guide bar 48 which is fitted to pass a through hole formed at the center of the rubber with a minute clearance.

In this embodiment, the weighed materials loaded on the weighing hopper 9' are borne by the frame 2 through the leaf spring 40" and the strain generator 29" as well as through the support 5" and both the anti-vibration rubbers 331''', 331'''', so that base vibrations transmitted in the reverse direction are cancelled with the aid of the dummy cell 7' similarly to the foregoing embodiments, and further vibrations occurred at the time of throwing the weighed materials into the weighing hopper 9' are damped with both the anti-vibration rubbers 331''', 331'''' serving as an anti-vibration damper.

The above described embodiments of FIGS. 17 to 27 show one form of the invention in which a dummy cell having the same natural frequency as a load cell is associated with the load cell, which is supported on the frame through one or two metal-made strain generators as well as through one or two anti-vibration rubbers. Next, another form of the invention of this application in which the load cell is supported on the frame without including the dummy cell will be described by referring to embodiments shown in FIG. 28 and the subsequent figures in contrast with those embodiments shown in FIGS. 17, 19, 20, 22, 23, 24, 25 and 26.

First, in a weighing machine 100' according to an embodiment of FIG. 28, the support 5' integrally supporting the load cell 7 on one side is integrally connected, on the other side, to the strain generator 29 extending parallel to the load cell 7. The lower end of the strain generator 29 at the part adjacent to the weighing hopper 9' serves as the supporting surface 30, through which the strain generator is fixed to the frame 2 for supporting the load cell 7 thereabove. The plate-like anti-vibration rubbers 33, 33 are attached into the recesses formed in upper and lower surfaces 31, 32 of the strain generator 29 except for the part including the supporting surface 30.

In this embodiment, therefore, vibrations and damping thereof attendant on loading or throwing of goods into the weighing hopper 9' cause vertical displacement of the load cell through the strain generator 29, and the damping action is effected with metallic elasticity of the strain generator 29 and internal friction of the anti-vibration rubbers 33, 33.

Next, in a weighing machine 101' according to an embodiment of FIG. 29, the support 5' integrally supporting the load cell 7 in a cantilever fashion also integrally supports a pair of strain generators 29, 29 in the form of a Roberval's mechanism extending parallel to the load cell 7 on both sides thereof. The lower ends of the strain generators 29, 29 on the side of the weighing hopper 9' are fixedly attached to the frame 2 to be supported thereon. Further, the square pillar-shaped anti-vibration rubber 33' is integrally interposed as an anti-vibration damper under the support 5' between the same and the frame 2.

In this embodiment, therefore, the paired strain generators 29, 29 ensures parallel displacement of the load cell 7 in the vertical direction during vibrations and damping thereof attendant on loading or throwing of goods into the weighing hopper 9', and the damping action is effected with metallic elasticity of the strain generators 29 and the anti-vibration rubber 33' as an anti-vibration damper.

It should be understood that one of the strain generators 29, 29 may be dispensed with to leave only the remaining one on either side depending on design in this embodiment.

Further, in a weighing machine 102' according to an embodiment of FIG. 30, the load cell 7 is integrally supported on the support 5' in a cantilever fashion, and the support 5' is integrally attached to the frame 2 (not shown) through the strain generator 29 at the rear face of the latter. The anti-vibration rubber 331 as an anti-vibration damper is incorporated within the strain generator 29 in a fully filled state. With this arrangement, the load cell 7 is allowed to undergo parallel displacement in the vertical direction through the strain generator 29, and vibrations are damped with metallic elasticity and internal friction energy of the anti-vibration rubber 331.

Also in this embodiment, therefore, vibrations due to a shock attendant on loading or throwing of the weighed materials into the weighing hopper 9' can be damped promptly.

Moreover, in a weighing machine 103' according to an embodiment shown in FIG. 31, the strain generator for integrally supporting the load cell 7 is divided into front and rear halves 29', 29', and the parallel leaf springs 40, 40 constituting upper and lower bridges between the divided strain generators 29', 29' are integrally attached to the upper and lower surfaces thereof by means of screws 41, 41, thereby ensuring parallel displacement in the vertical direction. Further, the block-like anti-vibration rubber 331" as an anti-vibration damper is incorporated while being integrally filled in a space difined by the strain generators 29', 29' and the parallel leaf springs 40, 40, or fixedly held therebetween.

Incidentally, the rear face of one strain generator 29' on the rear side serves as the supporting surface 30 for the frame 2 (not shown).

Also in this embodiment, therefore, parallel displacement of the load cell 7 in the vertical direction is ensured by the leaf springs 30, 30 between the strain generators 29', 29', and vibrations attendant on loading or throwing of the weighed materials into the weighing hopper 9' can be damped and removed as quick as possible.

In a weighing machine 104' according to an embodiment shown in FIG. 32, the load cell 7 is attached to the frame 2 in a cantilever fashion through the strain generator 29 at the supporting surface 30 thereof. Further, the support 5' is integrally extended rearward from the load cell 7 through the bridge 42, and the compression type anti-vibration rubber 33" as an anti-vibration damper is interposed between the support 5' and another support 5" attached to the frame 2 through its supporting surface 30 which is parallel to the supporting surface 30 of the strain generator 29. In this embodiment, therefore, the strain generator 29 and the anti-vibration rubber 33" as an anti-vibration damper are disposed in parallel to each other, so that weight of the weighed materials imposed on the load cell is borne by the frame through the strain generator 29 and vibrations in this system are damped with the vibration rubber 33".

FIG. 33 shows another embodiment which employs a modified anti-vibration rubber of compression type in place of the anti-vibration rubber 33" used in the embodiment of FIG. 32. In a weighing machine 105' according to the embodiment shown in FIG. 33, the load cell 7 is integrally attached at its proximal end to the support 5', which in turn is integrally attached to one of the strain generators 29', 29' on the front side which have the form of and are arranged in a vertically reversed relation. The parallel leaf springs 40, 40 are integrally attached to the upper and lower surfaces of the strain generators 20' by means of bolts 41, 41. Further, the other of the strain generators 29', 29' on the proximal side is integrally attached to the frame 2 (not shown) through the supporting surface 30, and an anti-vibration rubber 33' as an anti-vibration damper of compression type is disposed in a space defined by both the strain generators 29', 29'. In this embodiment, weight of the weighing hopper 9' is transmitted to the frame 2 through the support 5', strain generators 29', 29' and the parallel leaf springs 40, 40, and vibrations occurred at the time of throwing the weighed materials into the weighing hopper are damped with the anti-vibration rubber 33'.

FIG. 34 shows another embodiment which has a function of vertical parallel displacement comparable to that of the parallel leaf springs 40, 40 attached to the strain generators 29', 29' in the foregoing embodiment. In a weighing machine 106' according to the embodiment shown in FIG. 34, upper and lower bridges between the pair of front and rear strain generators 29', 29' include joggled lap joints 43, 43 which permit adjustable positioning by means of bolts 44 and elongated slots 45, and the paired strain generators 29', 29' are interconnected through two pairs of parallel blocks 40', 40' which are constrained to be unmovable in the lateral direction and which are able to displace only in the vertical direction. The rear strain generator 29' has the supporting surface 30 for fixing to the frame (not shown), while the front strain generator 29' has the supporting surface for the support 5' to which is attached the load cell 7. The anti-vibration rubber 33'" as an anti-vibration damper is interposed between the pair of strain generators 29' and 29' in the lengthwise direction as a shear type anti-vibration rubber. In this embodiment, therefore, the load cell 7 is supported to be displaceable in the vertical direction upon vibrations, and vibrations occurred at the time of loading or throwing the weighed materials into the weighing hopper 9' are damped with the anti-vibration rubber 33'" through its shear resistance.

Next, in a weighing machine 107' according to an embodiment shown in FIG. 35, the load cell 7 is integrally attached at its proximal end to the support 5"', and the block 46 is integrally attached to the upper surface of the support 5" by means of bolts (not shown). The compression type anti-vibration rubber 33a''' as an anti-vibration damper is interposed between the support 5" and the block 46, and likewise another anti-vibration rubber 331'''' of compression type is interposed between the support 5" and the frame 2. The guide bar 48 fixedly screwed at its lower end into the frame 2 is fitted to pass through those four members. Further, the leaf spring 40" is integrally fixed by means of screws 41, 41 between the rear upper surface of the block 46 and the upper surface of the strain generator 29" which is fixedly attached to the frame 2 through its supporting surface 30.

Incidentially, the anti-vibration rubber 331'''' interposed at the upper position is integrally attached to the guide bar 48 at a given height, while the anti-vibration rubber 331'''' interposed at the lower position receives the guide bar 48 which is fitted to pass a through hole formed at the center of the rubber with a minute clearance.

In this embodiment, the weighed materials loaded or thrown into the weighing hopper 9' are borne by the frame 2 through the leaf spring 40" and the strain generator 29" as well as through the support 5" and both the anti-vibration rubbers 331''', 331'''', so that vibrations occurred at the time of loading or throwing the weighed materials into the weighing hopper 9' are damped with both the anti-vibration rubbers 331''', 331'''' serving as an anti-vibration damper.

It should be understood that application forms of the invention are of course not limited to the above mentioned embodiments, and various forms using hydraulic dampers, for example, can be adopted as an anti-vibration damper.

According to the invention of this application, as seen from the above description, there can be basically attained a valuable effect as follows. When the materials to be weighed are thrown in or loaded at the time of measuring weight by use of a load cell, the anti-vibration damper functions to effectively damp vibrations produced unavoidably separate from so large shock as to impart permanent strain on the machine itself, whereby load vibrations at natural frequency of the load cell are damped and stabilized as quick as possible, and whereby detection of weight can be made surely.

Further, since the load cell and/or dummy cell are mounted to the frame in a cantilever fashion through an anti-vibration damper and one or more metal-made strain generators disposed therebetween, one-freedom vibration system is constituted which comprises a resilient factor due to metallic elasticity of the strain generators and a damping factor due to internal resistance of the anti-vibration damper. This results in a valuable effect that damped vibrations are quickly restrained under cooperation of both above factors and hence weight can be measured surely.

A parallel link function of the strain generators provided between the frame and the load cell ensures vertical parallel displacement of the load cell relative to the frame when the former undergoes damped vibrations through the anti-vibration damper, thereby resulting in such an effect that the damped vibrations are converged stably without causing any new secondary disturbance.

In a weighing machine equipped with a dummy load cell, this dummy load cell functions to avoid such a potential fear that base vibrations attributable to ground, etc. are transmitted from the base for installation to the load cell through the frame so as to mix an output signal due to base vibrations in the detection signal out of the load cell separate from the component due to the damped vibrations, and this would lead to inaccurate weighing. There can be thus attained a valuable effect of enabling accurate detection of weight surely.

Since the anti-vibration damper is disposed between the frame and the load cell which is mounted to the former in a cantilever relation, there can be attained two-freedom system which includes one freedom of damping due to internal friction of the anti-vibration damper in addition to the other freedom of vibration at natural frequency of the load cell. This results in such an effect that the damped vibrations are restrained quickly and weighing is made precisely.

Further, a parallel linkage provided on the outer side of the anti-vibration damper causes the load cell to make parallel displacement relative to the frame when the load cell undergoes damped vibrations, thus resulting in such an effect that vibrations are damped stably without causing any new secondary disturbance.

In case of using the dummy load cell, a dummy mass is attached to its distal end or other parts to give the dummy load cell with the same natural frequency as that of the load cell, so that both cells are enable to output the same signal for base vibrations. Base vibrations applied to the load cell are detected by the dummy load cell and the detection signal is subjected to arithmetic operation using a microcomputer or the like, thereby making it possible to cancel the fluctuating component due to base vibrations out of the detection signal from the load cell. This results in a valuable effect of permitting to measure weight corresponding to only the loaded weight, i.e., the net weight, correctly.

Moreover, since the load cell is usually formed with a frame hole, the dummy mass attached to the dummy load cell can be set in the frame holes formed in both cells. This results in such an effect that the weighing machine can be compacted.

What is claimed is:

1. In a weigh machine, a load cell, having at one end thereof a support for supporting a weighing machine, is connected at the other end thereof to a second support which is connected to a frame through an elastic body, the improvement being that said load cell is connected through said second support to said frame through an antivibration damper said improvement further comprising a dummy load cell, separate from said load cell and attached to said second support, said dummy load cell being spaced from said load cell and having a dummy mass which has the same natural frequency as said load cell, said dummy mass being provided on a third support mounted at the end of said dummy load cell and curved back between said dummy load cell and said load cell and situated in frame holes formed in both the said load cell and said dummy load cell, and said second support is attached to said frame in cantilever fashion.

2. A weighing machine according to claim 1, wherein said dummy mass is interchangeably mounted on said third support.

* * * * *